United States Patent [19]

Nelson et al.

[11] Patent Number: 5,505,017
[45] Date of Patent: * Apr. 9, 1996

[54] FLYING INSECT TRAP USING REFLECTED AND RADIATED LIGHT

[75] Inventors: Thomas D. Nelson, Maplewood; Douglas G. Anderson, Lakeville, both of Minn.

[73] Assignee: Ecolab Inc., St. Paul, Minn.

[*] Notice: The portion of the term of this patent subsequent to Jan. 4, 2013, has been disclaimed.

[21] Appl. No.: 327,108

[22] Filed: Oct. 21, 1994

Related U.S. Application Data

[63] Continuation of Ser. No. 264, Jan. 4, 1993, Pat. No. 5,365,690.

[51] Int. Cl.$^6$ .................................................. A01M 1/04
[52] U.S. Cl. ............................................ 43/113; 43/114
[58] Field of Search ............................. 43/112, 113, 114

[56] References Cited

U.S. PATENT DOCUMENTS

| | | | |
|---|---|---|---|
| D. 81,664 | 7/1930 | Rubins . | |
| D. 109,522 | 5/1938 | Perkins . | |
| D. 225,631 | 12/1972 | Gilbert | D22/19 |
| D. 253,606 | 12/1979 | Yavnieli | D22/19 |
| D. 269,632 | 7/1983 | Roberston et al. | D22/19 |
| D. 320,668 | 10/1991 | Kluck | D26/85 |
| D. 324,742 | 3/1992 | Kluck | D26/85 |
| D. 325,954 | 5/1992 | Lazzeroni, Sr. et al. | D224/123 |
| D. 335,912 | 5/1993 | Brown et al. | D22/122 |
| 970,784 | 9/1910 | Buhm . | |
| 1,009,580 | 11/1911 | Robinson . | |
| 1,280,359 | 10/1918 | Abresch . | |
| 1,304,397 | 5/1919 | Snead . | |
| 2,645,877 | 7/1953 | Pohlman | 43/113 |
| 2,731,762 | 1/1956 | Jones | 43/113 |
| 2,786,298 | 3/1957 | Smith | 43/118 |
| 2,787,083 | 4/1957 | Jones | 43/113 |
| 3,059,373 | 10/1962 | Gardner | 43/113 |
| 3,346,988 | 10/1967 | Fm | 43/112 |
| 3,348,332 | 10/1967 | Fee et al. | 43/113 |
| 3,465,468 | 9/1969 | Fee | 43/113 |

(List continued on next page.)

FOREIGN PATENT DOCUMENTS

| | | |
|---|---|---|
| 2551322 | 3/1985 | France . |
| 3506030 | 8/1986 | Germany . |
| 50-35778 | 4/1975 | Japan . |
| 3-250501 | 11/1991 | Japan . |
| 631324 | 8/1982 | Switzerland . |

OTHER PUBLICATIONS

Gilbert Insect Light Traps product literature.
"Electronics, adhesive offer sanitary fly control," Competitive Literature Review, Publication: Pest Control, Nov. 1992.
"Effect of Components on Insect Light Trap Performance," J. P. Hollingsworth et al., Transactions of the American Society of Agricultural Engineers, vol. 15, No. 5, pp. 924–927.
Micro–Gen Introduces: The Vector™ Fly System product literature.
"Design Parameters That Affect the Performance of UV–emitting Traps in Attracting House Flies (Diptera: Muscidae)," L. G. Pickens et al., Journal of Economic Entomology, vol. 79, No. 4, Aug. 1986, pp. 1003–1009.
I–O–C™ Insect–O–Cutor product literature.
Venus Flylite™ product literature.

*Primary Examiner*—Kurt Rowan
*Attorney, Agent, or Firm*—Merchant, Gould, Smith, Edell, Welter & Schmidt

[57] ABSTRACT

An insect trap using attractant light, comprising a source of light and a housing can be mounted on a vertical surface or placed near a ceiling surface. The housing and the source of light cooperate to form an upwardly facing opening for the facilitated entry of flying insect pests and for the reflection of light onto the vertical surface. Insects that enter the trap are immobilized on a surface within the trap. Cooperation between direct radiant light, reflected light and an upwardly facing entrance for insects substantially increase capture rates.

11 Claims, 1 Drawing Sheet

U.S. PATENT DOCUMENTS

| | | | |
|---|---|---|---|
| 3,491,478 | 1/1970 | Gilbert | 43/112 |
| 3,685,198 | 8/1972 | Smith | 43/112 |
| 3,768,196 | 10/1973 | Iannini | 43/112 |
| 3,998,000 | 12/1976 | Gilbert | 43/112 |
| 4,027,151 | 5/1977 | Barthel | 240/41.35 R |
| 4,044,494 | 8/1977 | Grajnert | 43/119 |
| 4,117,624 | 10/1978 | Phillips | 43/113 |
| 4,141,173 | 2/1979 | Weimert et al. | 43/113 |
| 4,229,779 | 10/1980 | Bilson et al. | 362/217 |
| 4,332,100 | 6/1982 | Schneider | 43/113 |
| 4,490,937 | 1/1985 | Yavieli | 43/112 |
| 4,696,126 | 9/1987 | Grothaus et al. | 43/112 |
| 4,700,506 | 10/1987 | Williams | 43/113 |
| 4,829,702 | 5/1989 | Silvandersson | 43/114 |
| 4,876,822 | 10/1989 | White | 43/113 |
| 4,918,856 | 4/1990 | Olive et al. | 43/113 |
| 4,949,501 | 8/1990 | Larkin | 43/113 |
| 4,959,923 | 10/1990 | Aiello et al. | 43/112 |
| 4,979,329 | 12/1990 | Olive et al. | 43/113 |
| 5,044,112 | 9/1991 | Williams | 43/113 |
| 5,142,815 | 9/1992 | Birdsong | 43/113 |
| 5,259,153 | 11/1993 | Olive et al. | 43/113 |
| 5,331,760 | 7/1994 | DuMont | 43/17.1 |

FLYING INSECT TRAP USING REFLECTED AND RADIATED LIGHT

This is a continuation of application Ser. No. 08/000,264, filed Jan. 4, 1993, now U.S. Pat. No. 5,365,690, which application is incorporated herein by reference.

FIELD OF THE INVENTION

The invention relates to an illuminated trap adapted to attract flying insects and immobilize the insect within a trap housing. The trap uses a source of attractant light in combination with a preferred enclosure or housing configuration to increase the capture rate.

A number of flying insect traps using attractant light sources have been proposed in the prior art. The Insect-O-Cutor fly traps made by I-0-C use an exposed bulb with a high voltage electrocuting systems. Pickens and Thimijan disclose exposed UV-emitting light sources and electrified grids for trapping and electrocuting flying insects. Another trap system generally uses frontally or horizontally exposed ultraviolet black lights for attracting insects to the trap. In the trap the insect lands on an electric grid in the rear of the cabinet. The grid provides a low voltage pulse that causes the insect to fly down onto a nontoxic adhesive trapping board. The captured insect can then be disposed with the removable adhesive sheet. Grothaus et al., U.S. Pat. No. 4,696,126, discloses an exposed bulb adhesive trap. Lazzeroni, Sr. et al., U.S. Pat. No. Des. 325,954, discloses a generally front facing exposed bulb trap. Aiello et al., U.S. Pat. No. 4,959,923, is related to Lazzeroni, Sr. et al., U.S. Pat. No. Des. 325,954, using ultraviolet light source pulsed electricity to stun insects and an adhesive trap. Similarly, Gilbert insect light traps use exposed bulbs and generally front facing entry spaces for fly trapping purposes. Hollingsworth and Hartstack, Jr. disclose data relating to the efficiency of a variety of components of exposed bulb fly traps.

Larkin, U.S. Pat. No. 4,949,501, and the ARP Venus Flylite™ system disclose an attractant light source. The light source and its housing are hinged on a wall attachment means such that the unit can be used in a vertical mode wherein the light source is parallel to the vertical surface and is placed at an angle of 90° to the horizontal surface perpendicular to a vertical surface. In this so called invisible mode, used during business hours, the trap is designed to maintain the operational components of the fly trap away from the detection. The fly trap can be placed in a "turbo" mode wherein the light source and housing are perpendicular to the vertical surface and horizontal to the floor (or at an angle greater than 90° to the vertical surface) thus exposing the light directly to view at the installation site which is asserted to increase insect attraction.

White, U.S. Pat. No. 4,876,822, discloses a flying insect unit comprising a rectangular housing enclosing a light source and an adhesive trapping surface. The housing components are either parallel to or perpendicular to the vertical mounting surface.

In our work modeling light attractant fly traps, we have found the geometry of these prior art light traps neither display the attractant light to the maximum advantage nor use an improved trap insect entry geometry.

BRIEF DISCUSSION OF THE INVENTION

We have developed a trap comprising a housing surrounding a light source, the housing containing a trap positioning means or mounting means for a vertical surface and a pest immobilization surface. We have found that the geometry of the housing of a fly trap surrounding an attractant light source can enhance flying insect capture rates. We have found that an open upwardly facing entry area, and an reflective surface angled to the horizontal surface cooperate with a source of attractant light to substantially increase fly capture rates. The flying insect traps of this invention are adjacent to or mounted on a vertical surface or horizontal ceiling surface, typically a wall or ceiling wherein the angled walls of the fly trap housing provide an upwardly facing, top-sided entryway for walking or flying entrance of, insect pests and further provide direct radiation of light, the reflection and diffusion of the attractant light from the source onto the vertical surface or ceiling surface in an effective and efficient attracting light display. We have further found that colors contrasting to the vertical surface or ceiling surface used in the exterior of the housing or enclosure cooperate with colors of the adjacent surface on which the fly trap is mounted to increase capture rates.

DETAILED DESCRIPTION OF THE INVENTION

Figure 1:
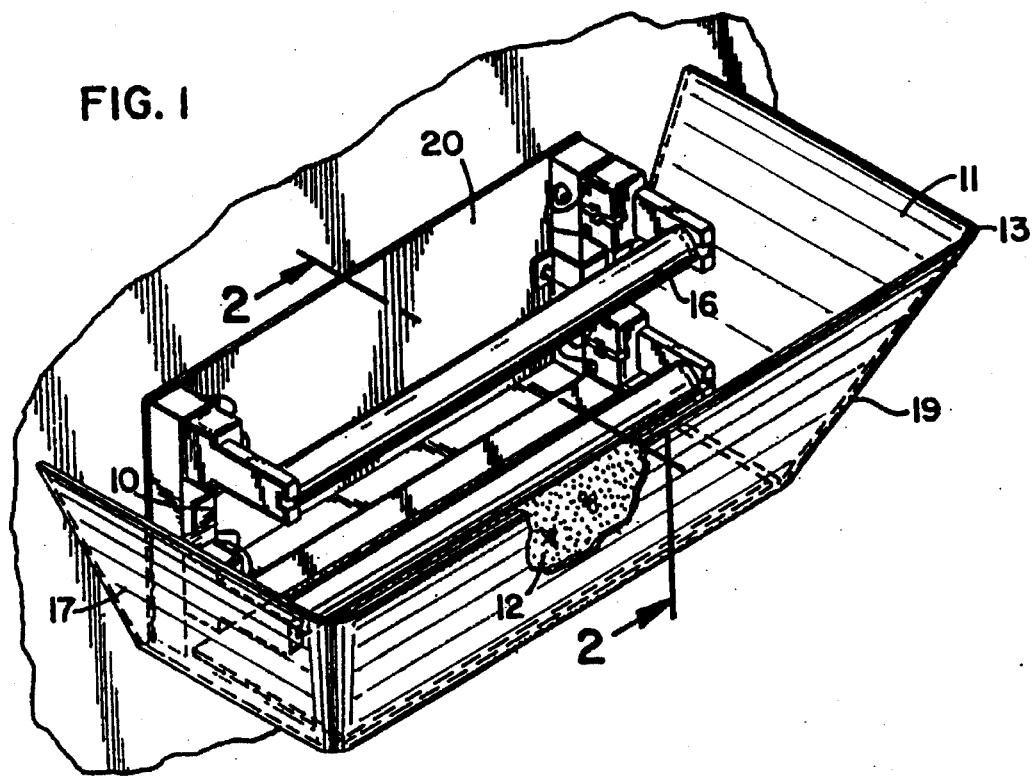
FIG. 1 contains views of the fly trap showing the cooperative association of the light source, the housing, the reflective surface, the immobilization surface and the mounting means.

The reflected light insect trap generally comprises a housing operatively attached to a light source, an insect immobilization surface and a positioning means.

We have found that light from the light source radiates and reflects directly from the upwardly facing opening of the trap into a space generally and onto wall surfaces and ceiling surfaces above the trap. Further, the reflecting surface directs reflected light onto the vertical surface or ceiling surface to further increase capture rates. The light source useful in the fly trap of the invention comprise a source of ultraviolet light. Such light sources are commonly incandescent or fluorescent electrically driven light sources that can emit a broad spectrum of wavelengths but are primarily optimized to emit ultraviolet light. For the purposes of this invention ultraviolet light comprises radiation having wavelengths between about 400 Å and 40 Å that has been found to be attractive to flying insect species. The light sources commonly provide from about 0.5 to about 100 watts of light output, preferably the lights provide from about 0.5 to about 75 watts. Preferred light sources are fluorescent having from about 1 to about 40 watts per tube unit. The trap can use a single source or two or more sources horizontally or vertically arranged in the housing. The units can be designed for service or household power or for battery power using electronic conversion circuits adapted to drive the light source. The light source can be mounted within the housing with standard plug-in units.

The light source is substantially enclosed within a housing having an internal surface at least partially covered with a reflective layer. The housing encloses the light source or sources but provides a substantial upwardly facing opening for the walking or flying entry of flying insect pests. The housing is commonly made from commonly available structural materials including thermoplastics such as polyethylene, polypropylene, polyethyleneterephthalate; metallic materials such as aluminum, magnesium or related alloys; wood or wood products; reinforced thermoplastics or thermosetting materials; paperboard, pressed paperboard, corrugated paperboard, and others.

The interior of the housing contains a reflective layer and is at least partially reflective. Such reflective layers can be made from shiny metallic surfaces such as aluminum foil, metallized polyester bright-white reflected panels, silvered glass mirrors or other related reflective surfaces.

The housing also can contain an insect immobilization means. For the purpose of this invention the term insect immobilization means includes any device or surface that can prevent flies from exiting the fly trap after entry. Such immobilization means can include pesticides in the form of a surface, layer or trap, active and passive mechanical traps, liquid traps into which the flies become immersed, adhesive layers, pressure sensitive adhesive layers, high or low, D.C. or pulsed voltage electric grids, or other such means that can trap, immobilize, kill or dismember the insect pests.

A preferred immobilization means for the purposes of this invention comprises an adhesive surface. The most preferred surface comprises a highly tacky pressure sensitive adhesive surface. One useful adhesive is the Tangletrap adhesive made by the Tanglefoot Co. Such a surface, installed within the housing below the light, is positioned such that the preferred entry way for flying insect pests through the top opening is in an optimal location for the entering insect pest to first come to rest directly on the adhesive surface.

The traps of this invention can include an insect attractant chemical. Insect attractant chemicals are typically organic material that are at least somewhat volatile and are products arising from typical insect food sources or are a pheromone or a mixtures of pheromones.

The insect trap can also contain an effective amount of an insecticide. A variety of volatile and non-volatile insecticides and formulated insecticide compositions are known to be effective against flying insects and most can be used. However, the preferred insecticides for use with this invention are nonvolatile formulated insecticide compositions that kill insect pests upon contact. Such nonvolatile pesticide compositions are not released into the environment surrounding the fly trap. Such materials include pyrethroid and organophosphate insecticide compositions.

The preferred mode of construction of the insect trap of the invention involves the geometry of the reflecting surfaces in the insect trap. We have found that the housing in the prior art having both vertical or horizontal surfaces have some capacity for insect attractancy. However, we have found that an improved geometry of the housing can substantially and surprisingly increase the attractancy of flying insect pests. We have constructed insect traps having an upwardly facing opening and side walls positioned at an angle to the horizontal surface of less than 90°, preferably less than 80°. Such a slanted reflective surface, we have found, reflects and displays the light from the light source on the vertical mounting surface in a highly effective pattern that can substantially increase attractancy and capture rates. We have found that the attractancy of such devices peaks at an angle of 45°–75°, preferably about 60° between the reflecting surface and the horizontal surface.

The insect traps of the invention having an upwardly facing opening can have contaminating materials enter through the opening or can invite misuse resulting from objects thrown into the opening. In order to protect the trap from such problems, a barrier to such misuse that does not prevent the entry of insects or the direct or reflected radiation of light from the trap can be installed on the upwardly facing opening. Such barrier must substantially maximize the open area of the upwardly facing opening and provide a minimal entry barrier. For, the purpose of this invention, grids or screens having a dimension sufficiently large to permit entry of insects but exclude objects that are thrown or otherwise directed into the upwardly facing opening can be excluded. Such screens or grids can be made from a variety of materials including transparent or opaque materials. Such materials include metallic wires, synthetic or naturally occurring fiber threads, thermoplastic grids, expanded metal, wire screens, etc.

The insect trap of the invention can be placed on a horizontal surface adjacent to a vertical surface or a ceiling surface or can be mounted directly on a vertical surface or ceiling surface. Correct placement increases insect capture through direct radiation of light and reflection of light onto either a vertical or horizontal surface (ceiling). The insect traps of the invention can be placed on horizontal surfaces adjacent to the vertical surfaces or adjacent to ceiling surfaces in the use locus. Once placed in such locations, the fly traps are placed adjacent to such surfaces at a distance such that light from the traps are radiated onto or reflected onto the vertical surface or the ceiling surface. Further, the traps are placed such that the contrasting trap color to the vertical surface can aid in increasing capture rates. Accordingly, when placed into the environment, the traps are typically wall mounted or placed within 30–50 inches of the vertical surface or the ceiling surface or less. When placed in the use environment, the mounting means includes a mechanical system that can support the weight of the trap and can maintain the upwardly open entry for insects. Such traps can fixed in place using a variety of mounting hardware such as screws, bolts, nails, clips, flanges, etc. or can be temporarily placed in the use locus using velcro fasteners, pressure sensitive adhesive pads, rubber feet, etc. Commonly available mounting means can be used for fixing the insect trap on a vertical surface. The housing can contain a flange, tab or hook that can interact with the vertical surface holding the trap in place using fasteners such as screws, nails, permanent structural adhesives, velcro, etc. Additionally, the fly traps can be suspended from ceilings and can rest against the vertical surface using suspending straps, cables, chains, etc. Alternatively, the attachment means can comprise an aperture in the housing that permits the fly trap to hang on cooperative hooks, protrusions or other suspension points on the vertical surface. The important characteristic of the mounting means for the fly trap is that the trap be securely mounted on the vertical surface such that the vertical surface or wall receive an insect attractive display of diffused and reflective light from the trap to increase capture rates. Additionally, the wall can act to define the upwardly facing opening of the fly trap. The housing can entirely enclose the illumination source or can enclose the illumination source on three sides using the vertical surface to complete the enclosure.

The illumination source can be mounted directly to the housing or can be mounted on the vertical surface surrounded by the housing. Preferably, the light source is mounted on a support attached to the housing. The support can be mounted in any portion of the housing, however, preferably the light source is mounted on portions of the insect trap adjacent to the vertical surface. The light source is then positioned optimally to direct a substantial proportion of the radiated energy onto the reflective surface. The light is then reflected from the angled reflective surfaces onto the vertical surface above and to either side of the insect trap.

Similarly the immobilization surface can be fixed in any location within the housing. The immobilization surface is preferably placed in a location within the housing where the immobilized insect pests are hidden from view. Preferably, the immobilization surface is placed directly opposite the upwardly facing opening. Walking or flying insect pests then entering the trap from above will be directed by the light source to the bottom portion of the light trap containing the immobilization surface. The immobilization surface is preferably installed across a portion of the bottom, the entire area of the bottom of the light trap and can additionally continue upwardly onto the curved surfaces. Clear or pigmented white adhesives, preferably pressure sensitive adhesives, can be used which will cooperate with the reflecting surfaces of the angled side walls to aid in directing reflected light onto the vertical surface.

The insect trap housing of the invention typically comprises a reflecting surface that reflects light onto a vertical surface or a ceiling surface adjacent to the trap to increase capture rate. The reflecting surface can have a variety of configurations with respect to the light placement. The lights can be positioned vertically with respect to the reflecting surface such that the light is above the highest projecting portion of the reflecting surface, can be approximately equal to the height of the projecting surface or can be substantially below the high point of the reflecting surface. In the instance that the light source comprises multiple sources, the reflecting surface discussion relates to the highest source in the housing configuration. A housing designed for placement on a horizontal surface in close relationship with the vertical surface can take a variety of shapes. The insect trap can be generally circular, oval, ellipsoidal, can be an extended shape having parallel sides and either rectilinear or curved ends, the trap can be triangular, square or rectangular, hexagonal, octagonal, etc. However, it is important to maintain in each trap configuration the angled reflective surface to maintain reflection of light. The reflection surface can be the exterior wall of the trap or can be a surface installed within a vertical wall or a wall mounted at an angle other than the angle of the reflected surface. In other words, the exterior wall of the housing can be at any arbitrary angle to other housing components and a horizontal surface as long as an internal surface within the housing is positioned at the desired angle for the reflecting surface. When the trap of the invention is mounted on a vertical surface such as a wall, it can be mounted at virtually any height. Typically, the side of the fly trap adjacent to the vertical surface is configured to match the vertical surface. The most common vertical surface present in most use loci is a flat vertical surface.

Preferably, the insect trap of the invention is installed in a location with a high concentration of insects at or above eye level permitting the installation of the illumination source to reside at the top, inside of the housing adjacent to the vertical surface.

The insect trap of the invention can be manufactured in a variety of ways. The traps can be molded from thermoplastic materials or can be assembled from flat or substantially planar components that are attached using commonly available fasteners to form the angled side walls and the flat bottom. Once a housing is assembled that can be mounted on a wall such that the light sources are substantially enclosed, the mounting hardware can be introduced onto the housing with the appropriate installation of the immobilization surface and the light source. The insect traps of the invention can be hardwired in place, can be empowered using electrical cords or can have batteries installed at available locations in the housing.

Experimental Section

In the development of the insect traps of the invention, a substantial body of work was conducted to discover the insect trap geometry that would provide peak capture rates for flying insects. We found that insect pests enter the trap either by alighting on the vertical surface and entering the trap by walking or by flying directly into the insect trap alighting on the first available surface. We have found that using either mode of entry, the most likely direction of entry will be vertically into an upwardly facing trap. Accordingly, we have found that it is highly desirable to avoid placing any substantial barrier in the flying insect trap that would prevent entry from above. No barrier should be placed to impede insects from walking down the vertical surface into the trap. The light sources should not be substantially virtually obscured by any portion of the housing. Grids or screens installed in the housing should have minimal barrier properties. Further, in illuminated traps, we have found that there is a substantial increase in capture rates if the reflective surface in the trap is not fixed at an angle that is parallel or perpendicular to the vertical mounting surface. We have found that such a configuration substantially reduces the efficiency of the attractant light because the light is not adequately displayed to the insects causing attractancy. Further we have found that the bare light sources, while they are bright, do not attract the insects as well as a combination of direct radiated light and a diffused display of reflective light on the vertical surface. We have also found that the use of a contrasting color, generally a darker color, in the trap housing to the color of the vertical surface increases capture rates.

In conducting capture rate experiments, the fly traps of the invention are installed in an appropriate location in a room having white walls and ceiling, 50% relative humidity, insect food, competing fluorescent lights, and a density of approximately one fly per each 10 cubic feet of room space. The fly density was optimized to reduce statistical noise in experimental results. The mean data represent the mean number of flies captured per each one half hour. A prototype trap was installed in the experimental room in order to determine the impact on capture rates resulting from trap modification including the opening of the trap facing in a variety of directions. Traps were installed with openings upwardly directed, downwardly directed and horizontally directed. Statistically significant differences between the upwardly "open" configuration and all other configurations which are called "closed" were found (Table 1). The use of an upwardly facing opening had a strong increase on mean capture rates and resulted in greater than a 40% increase in fly capture rates when a trap having an upwardly facing opening was installed on a vertical surface. The control experiment in the following tables comprises a flat bottom housing having no side walls surrounding the exposed bulbs.

TABLE 1

| Top Entry Configuration | Replicates | Mean* | Std. Dev. |
|---|---|---|---|
| Open | 12 | 23.083 | 6.067 |
| Closed | 12 | 16.417 | 5.017 |
| Control | 4 | 22.000 | 4.163 |

*Mean fly capture rate

Experiments were also conducted to determine the best angle at which a reflective surface is placed. Tables 2 and 3 show the housing geometry that were used. The housing angle relates to the angle between the housing wall and the horizontal surface.

TABLE 2

| Housing Angle | Replicates | Mean | Std. Dev. |
|---|---|---|---|
| Control | 3 | 15.3 | 6.7 |
| Thirty Degr. | 3 | 17.3 | 3.5 |
| Sixty Degr. | 3 | 19.7 | 2.5 |
| Ninety Degr. | 3 | 12.3 | 3.1 |

TABLE 3

| Housing Angle | Replicates | Mean | Std. Dev. |
|---|---|---|---|
| Thirty Degr. | 12 | 18.0 | 5.3 |
| Sixty Degr. | 12 | 23.6 | 5.9 |

These data show that the capture rate using reflecting surfaces at 30° or 60° angles are significantly better than a 90° surface. Further, the 60° surface is significantly better (by 31%) than the 30° surface in increased capture rates.

Table 4 shown below displays mean capture rates measured in flies per half hour and shows that a contrasting dark color significantly increases the capture rates for the fly trap installations. These data show that significantly more insects (greater than 34%) are attracted to a contrasting color in the housing exterior.

TABLE 4

| Trap Color | Count | Mean | Std. Dev. |
|---|---|---|---|
| White | 27 | 19.4 | 5.4 |
| Tan | 12 | 26.0 | 5.8 |

Further experiments were done to compare the effect of the installation of the shiny metallized polyester (Mylar) reflective surface within the housing with the effect of a non-reflecting surface. The results of the experiment are shown below in Table 5.

TABLE 5

| Interior Housing Surface | Count | Mean | Std.Dev. |
|---|---|---|---|
| Black[1] | 13 | 18.6 | 5.6 |
| Metallized Mylar[2] | 13 | 23.5 | 7.5 |

Our experimentation shown in Table 5 demonstrates a substantial increase in capture rates when a shiny reflective surface is installed within the housing. The metallized Mylar surface we have used shows a substantial increase (by 26%) in capture rates when compared to a black non-reflective surface. The capture rates resulting from the use of a black surface is an indication that the direct radiation of light from the light source through the upwardly facing opening is a substantial attractant effect.

Detailed Discussion of the Drawings

FIG. 1 shows views of the preferred fly trap of the invention. The fly trap comprises mounting means 10 comprising a bracket portion of the housing. Such brackets can be screw attached to the vertical surface 20. The housing displays an internal reflective surface 11 comprising an aluminum foil or metallized polyester surface. The internal housing surface contains a pressure sensitive adhesive surface 12 positioned below the light source or illumination units 16 opposite to the upwardly facing opening defined by the top 13 of the walls 19 of the housing. The external walls 19 of the housing are configured at a 60° angle to the horizontal surface 22 to optimize the area of ingress and to optimize the reflected display of light on the vertical surface from the fly trap. The exterior of the housing 19 displays a color contrasting to the color of the vertical surface 20. The illumination units 16 are fluorescent ultraviolet sources in sockets 17 that are commonly attached to household or service power. The adhesive surface 12 rests upon a bottom portion 18 which is a part of the housing 19. The fly trap is mounted on a vertical surface 20 such that the illumination units 16 are not directly viewed by an occupant of the installation locus. A ballast (not shown) can be placed in the housing beneath the adhesive 12.

Figure 2:
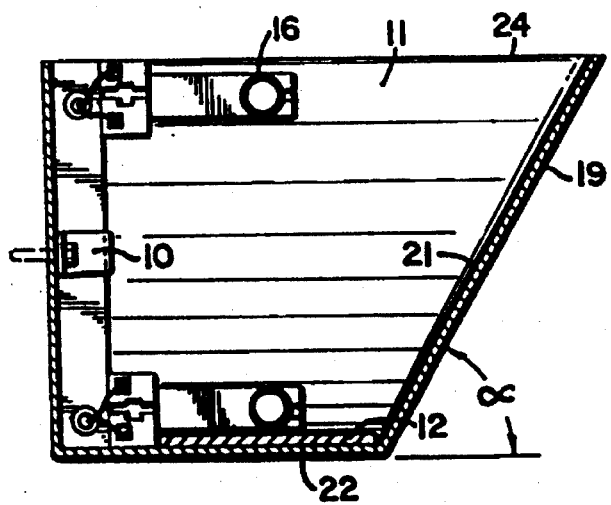
FIG. 2 is a cross section of FIG. 1.

FIG. 2 shows a cross section at 2 in FIG. 1. The insect trap of the invention can be mounted on the vertical surface using mounting means 10 which in FIG. 2 comprises a bracket and screw device. The trap is made using the housing 19 with an angled reflective surface 21 that aids in directing reflected light onto the vertical surface 20. The illumination sources 16 are positioned within the housing to radiate light through the upwardly facing opening 24 and onto the reflecting surface 21. Adhesive surface 12 rests upon a horizontal housing surface 22.

While the above specification, data and Figures provide a basis for understanding the advantages of using the disclosed geometry in illuminated insect traps, many embodiments of the invention can be made without departing from the spirit or scope of the disclosure herein. For that reason, the invention resides in the claims hereinafter appended.

We claim:

1. A flying insect trap that uses a display of reflected and radiated insect attractant light on a vertical mounting surface to obtain an effective flying insect capture rate, said trap comprising:

(a) a means for mounting a flying insect trap on a vertical mounting surface;

(b) a source of insect attractant light; and (c) a housing enclosing the source, said housing comprising:

(i) an internal reflecting surface, positioned at an angle that departs from the horizontal such that light from the source of insect attractant light is directed onto the vertical mounting surface forming a diffused light pattern; and (ii) an insect immobilization surface; wherein a substantial amount of attractant light is directed onto the vertical surface in an efficient attracting light display to obtain an increased flying insect capture rate, the housing comprises an upwardly facing opening for insect entry and the insect attractant light source is placed in the housing below an edge of the upwardly facing opening.

2. The trap of claim 1 wherein the source of insect attractant light comprises at least one source of ultraviolet light.

3. The trap of claim 1 wherein the insect immobilization surface comprises an adhesive surface.

4. The trap of claim 1 wherein the vertical mounting surface comprises a wall surface.

5. The trap of claim 1 wherein the trap further comprises an insect attractant chemical.

6. The trap of claim 1 wherein the housing comprises a one piece housing that surrounds the source of insect attractant light such that the source of insect attractant light cannot be directly viewed when the housing is installed above eye level.

7. The trap of claim 1 wherein the housing comprises a circular housing, an oval housing, an ellipsoidal housing.

8. The trap of claim 1 wherein the housing comprises a triangular housing.

9. The trap of claim 1 wherein the housing comprises a curved housing.

10. The trap of claim 1 wherein the angle is less than 90°.

11. The trap of claim 1 wherein the angle is about 45° to 75°.

* * * * *